(12) United States Patent
Akagawa

(10) Patent No.: US 11,380,179 B2
(45) Date of Patent: Jul. 5, 2022

(54) FIRE SENSING SYSTEM, FIRE SENSING METHOD, AND PROGRAM

(71) Applicant: NEC Corporation, Tokyo (JP)

(72) Inventor: Takeshi Akagawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 121 days.

(21) Appl. No.: 16/978,386

(22) PCT Filed: Mar. 7, 2018

(86) PCT No.: PCT/JP2018/008690
§ 371 (c)(1),
(2) Date: Sep. 4, 2020

(87) PCT Pub. No.: WO2019/171482
PCT Pub. Date: Sep. 12, 2019

(65) Prior Publication Data
US 2021/0056824 A1    Feb. 25, 2021

(51) Int. Cl.
*G08B 17/10* (2006.01)
*G08B 17/107* (2006.01)
*G01N 21/53* (2006.01)
*G01N 21/59* (2006.01)
*G08B 27/00* (2006.01)

(52) U.S. Cl.
CPC ......... *G08B 17/107* (2013.01); *G01N 21/532* (2013.01); *G01N 21/59* (2013.01); *G08B 27/005* (2013.01)

(58) Field of Classification Search
CPC .................................................. G08B 17/107
See application file for complete search history.

(56) References Cited

U.S. PATENT DOCUMENTS

2020/0319154 A1* 10/2020 Dohi ................... G08B 17/113
2020/0388127 A1* 12/2020 Lee ........................ G01N 21/53

FOREIGN PATENT DOCUMENTS

JP    S 48-079598 A    10/1973
JP    H 02-048797 A    2/1990
(Continued)

OTHER PUBLICATIONS

Japanese Office Action for JP Application No. 2020-504542 dated Jun. 1, 2021 with English Translation.
(Continued)

*Primary Examiner* — Travis R Runnings

(57) ABSTRACT

To provide a fire sensing system, fire sensing method, and program with which it is possible to identify the position of a fire using a low number of sensors A fire sensing system 1 provided with: gas sensors 11a, 11b, 11c for sensing a change in gas concentration at three locations $P_1$, $P_2$, $P_3$; a gas propagation speed calculation unit 12 for sensing gas concentration increase times $T_1$, $T_2$, $T_3$ at the three locations $P_1$, $P_2$, $P_3$ and calculating the gas propagation speeds $v_1$, $v_2$, $v_3$ at the three locations $P_1$, $P_2$, $P_3$; and a fire information estimation unit 13 for estimating the position of the fire on the basis of the gas concentration increase times $T_1$, $T_2$, $T_3$ and the gas propagation speeds $v_1$, $v_2$, $v_3$.

18 Claims, 8 Drawing Sheets

(56) References Cited

FOREIGN PATENT DOCUMENTS

| | | |
|---|---|---|
| JP | H 04-048398 A | 2/1992 |
| JP | H 11-120457 A | 4/1999 |
| JP | 2005-083876 A | 3/2005 |
| JP | 2007-026187 A | 2/2007 |
| JP | 2012-168683 A | 9/2012 |

OTHER PUBLICATIONS

International Search Report dated May 22, 2018, in corresponding PCT International Application.

* cited by examiner

FIRE SENSING SYSTEM, FIRE SENSING METHOD, AND PROGRAM

CROSS-REFERENCE TO RELATED PATENT APPLICATIONS

This application is a National Stage Entry of International Application No. PCT/JP2018/008690, filed Mar. 7, 2018. The entire contents of the above-referenced application is expressly incorporated herein by reference.

TECHNICAL FIELD

The present invention relates to a fire sensing system, a fire sensing method, and a program, and particularly relates to a fire sensing system, a fire sensing method, and a program that sense a fire by sensing a gas leading to a fire.

BACKGROUND ART

Detection of a harmful gas and a gas leading to a fire, in a factory, a pipeline, or the like, is performed. For example, many point sensors that sense carbon monoxide and carbon dioxide are installed in a predetermined area in a factory, a pipeline, or the like, and a fire is detected by sensing carbon monoxide and carbon dioxide. The point sensor refers to a sensor whose detection range is not a wide area but only an area near an arranged location. As the point sensor, a semiconductor sensor may be used, but a gas sensor using a phenomenon that light passing through a gas is attenuated by infrared absorption may be used. In a system using a gas sensor, a type and a concentration of a gas are estimated from a wavelength of light absorption and an attenuation amount of transmitted light that depend on a type of a gas.

For example, PTL 1 discloses a disaster prevention system that causes an optical signal to propagate in the atmosphere, measures a transmissivity (smoke concentration) and a gas concentration, and issues a fire alarm when both go beyond threshold values because of a decrease in transmissivity and an increase in CO gas concentration. The disaster prevention system in PTL 1 includes a laser emission means for emitting, in an underground station yard, a laser light near an absorption wavelength by a specific gas, and a laser reception means for receiving the emitted laser light in the underground station yard. A data processing unit calculates a concentration of the specific gas in the underground station yard by a laser absorption method, and calculates a smoke or fog transmissivity by taking a ratio between the emitted incident light and the received transmitted light. When the calculated measurement values of a specific gas concentration and a smoke or fog transmissivity go beyond predetermined values, a central control unit issues a fire alarm.

PTL 2 discloses a disaster prevention system in which spot-type gas sensors, smoke sensors, and temperature sensors are installed at appropriate intervals in a target area, and when data of a gas concentration or a smoke concentration that becomes equal to or higher than an abnormality determination level exist, a fire occurrence position is sensed from a temperature rise position.

CITATION LIST

Patent Literature

[PTL 1] Japanese Unexamined Patent Application Publication No. 2005-083876

[PTL 2] Japanese Unexamined Patent Application Publication No. H04-048398

SUMMARY OF INVENTION

Technical Problem

With the configuration disclosed in PTL 1, it is possible to issue a fire alarm by detecting that, because of a decrease in transmissivity and an increase in CO gas concentration, both go beyond threshold values, but it is difficult to identify a position of a fire origin In the configuration disclosed in PTL 2, spot-type gas sensors, smoke sensors, and temperature sensors are installed at appropriate intervals in a target area, and when data of a gas concentration or a smoke concentration that becomes equal to or higher than an abnormality determination level exist, a fire occurrence position is sensed from a temperature rise position, and thus, in order to identify a position of a fire, a large number of sensors are arranged in the target range.

An object of the present invention is to provide a fire sensing system, a fire sensing method, and a program that enable a position of a fire to be identified with a small number of sensors.

Solution to Problem

A fire sensing system according to one aspect of the present invention includes: gas sensors that sense changes in gas concentration at three locations; a gas propagation speed calculation unit that senses gas concentration increase time points at the three locations, and calculates gas propagation speeds at the three locations; and a fire information estimation unit that estimates a position of a fire, based on the gas concentration increase time points and the gas propagation speeds.

A fire sensing method according to another aspect of the present invention includes: sensing gas concentration increase time points at three locations; calculating gas propagation speeds at the three locations; and estimating a position of the fire, based on the gas concentration increase time points and the gas propagation speeds.

A program according to still another aspect of the present invention causes a computer to execute: processing of sensing gas concentration increase time points at three locations; processing of calculating gas propagation speeds at the three locations; and processing of estimating a position of the fire, based on the gas concentration increase time points and the gas propagation speeds.

Advantageous Effects of Invention

According to the above-described aspects of the present invention, a position of a fire can be identified with a small number of sensors.

EXAMPLE EMBODIMENT

Figure 1:
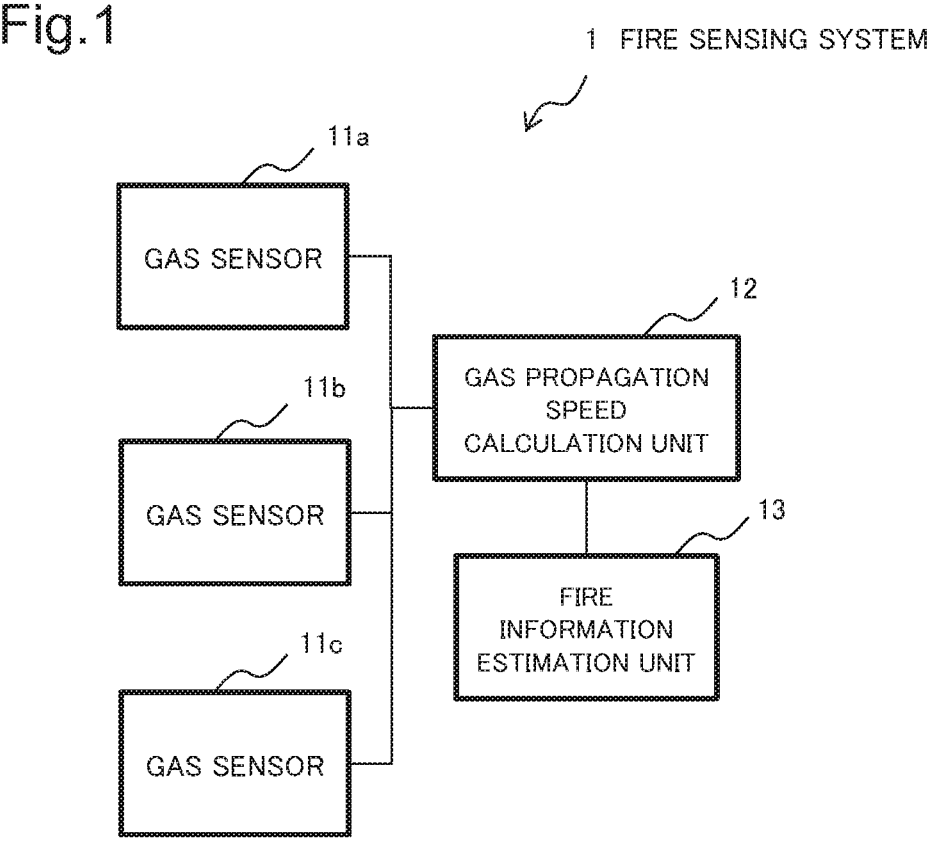
FIG. 1 is a block diagram illustrating a configuration of a first example embodiment.

The following describes example embodiments of the present invention in detail with reference to the drawings. FIG. 1 is a block diagram illustrating a configuration of a first example embodiment. A fire sensing system 1 of the present example embodiment includes three gas sensors arranged in a tunnel and sensing a gas concentration, and senses a fire. The following description is made on the assumption that a direction of the tunnel is an X direction, and a direction that is in a plane parallel to the ground and that is perpendicular to the tunnel is a Y direction. The present example embodiment is configured on the premise that a fire occurs on the ground.

As illustrated in FIG. 1, the fire sensing system 1 includes three gas sensors 11a, 11b, and 11c arranged at three locations $P_1$, $P_2$, and $P_3$ in the tunnel and sensing changes in gas concentration, and a gas propagation speed calculation unit 12 sensing, at the three locations, based on the sensed changes in gas concentration, gas concentration increase time points at each of which a gas concentration sharply increases due to a fire, and calculating gas propagation speeds at the three locations. The fire sensing system 1 includes a fire information estimation unit 13 estimating a position of the fire and an occurrence time point of the fire, based on the gas concentration increase time points at the three locations and the gas propagation speeds at the three locations.

Figure 2:
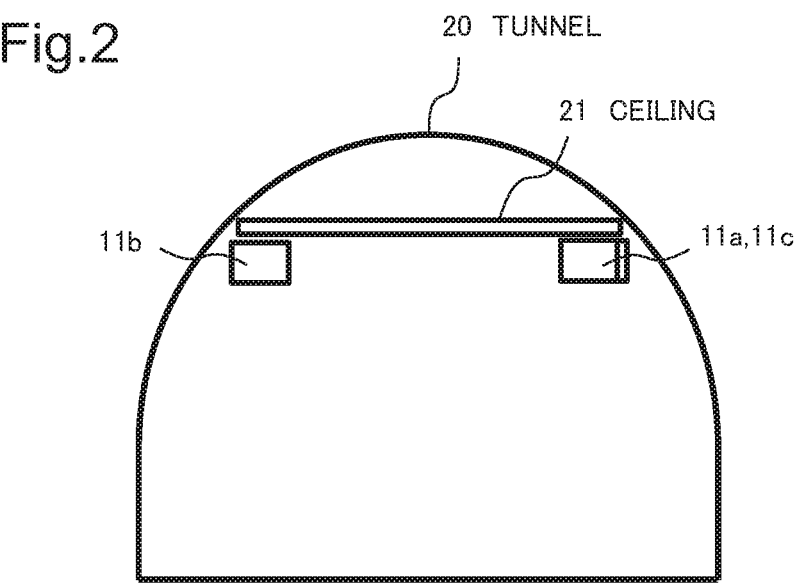
FIG. 2 is a diagram illustrating one example of arrangement of gas sensors in FIG. 1 viewed in a direction of a tunnel.

FIG. 2 is a diagram illustrating one example of arrangement of the gas sensors in FIG. 1 viewed in the direction of the tunnel. As illustrated in FIG. 2, the gas sensors 11a, 11b, and 11c are arranged in a plane parallel to the ground. The gas sensors 11a, 11b, and 11c may be arranged in an area near a ceiling 21 of the tunnel 20 in such a way as to be at substantially the same height from a road surface. The arrangement is not necessarily limited to that in a plane parallel to the road surface, and the gas sensors 11a, 11b, and 11c may be installed along a circular inner surface of the tunnel.

Figure 3:
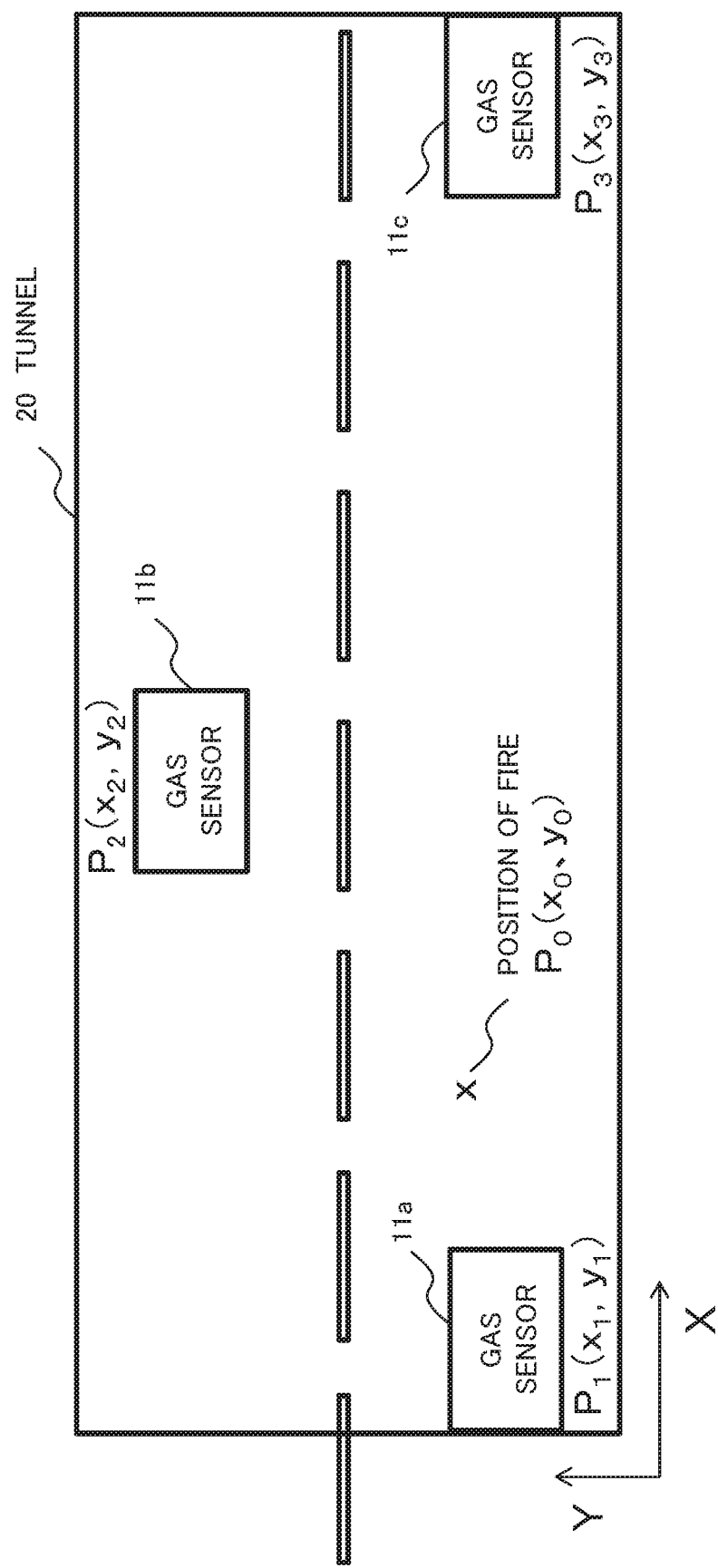
FIG. 3 is a diagram illustrating one example of arrangement of the gas sensors in FIG. 1 viewed from an upper side of a road.

FIG. 3 is a diagram illustrating one example of arrangement of the gas sensors in FIG. 1 viewed from an upper side of a road. As illustrated in FIG. 3, the gas sensors 11a, 11b, and 11c are arranged in such a way as not to be aligned on one straight line. For example, the gas sensors 11a, 11b, and 11c are arranged at positions different from each other with respect to the X direction, and with respect to the Y direction, at least one of the gas sensors is arranged at a Y coordinate different from those of the other two gas sensors. In the example of FIG. 3, the Y coordinate $Y_2$ of $P_2$ is different from the Y coordinates $Y_1$ and $Y_3$ of the other two locations $P_1$ and $P_3$. The gas sensors 11a, 11b, and 11c may be arranged at the same Y coordinate, but are arranged in such a way that with respect to the Y direction, the Y coordinate of at least one of the gas sensors is different from the Y coordinates of the other two gas sensors. Thereby, a fire position in the Y direction in a fire can be estimated, and for example, when a road includes a plurality of lanes, it is even possible to estimate which of lanes is a fire existence lane.

Each of the gas sensors 11a, 11b, and 11c senses a gas concentration, and outputs a change in sensed gas concentration to the gas propagation speed calculation unit 12.

Figure 4:
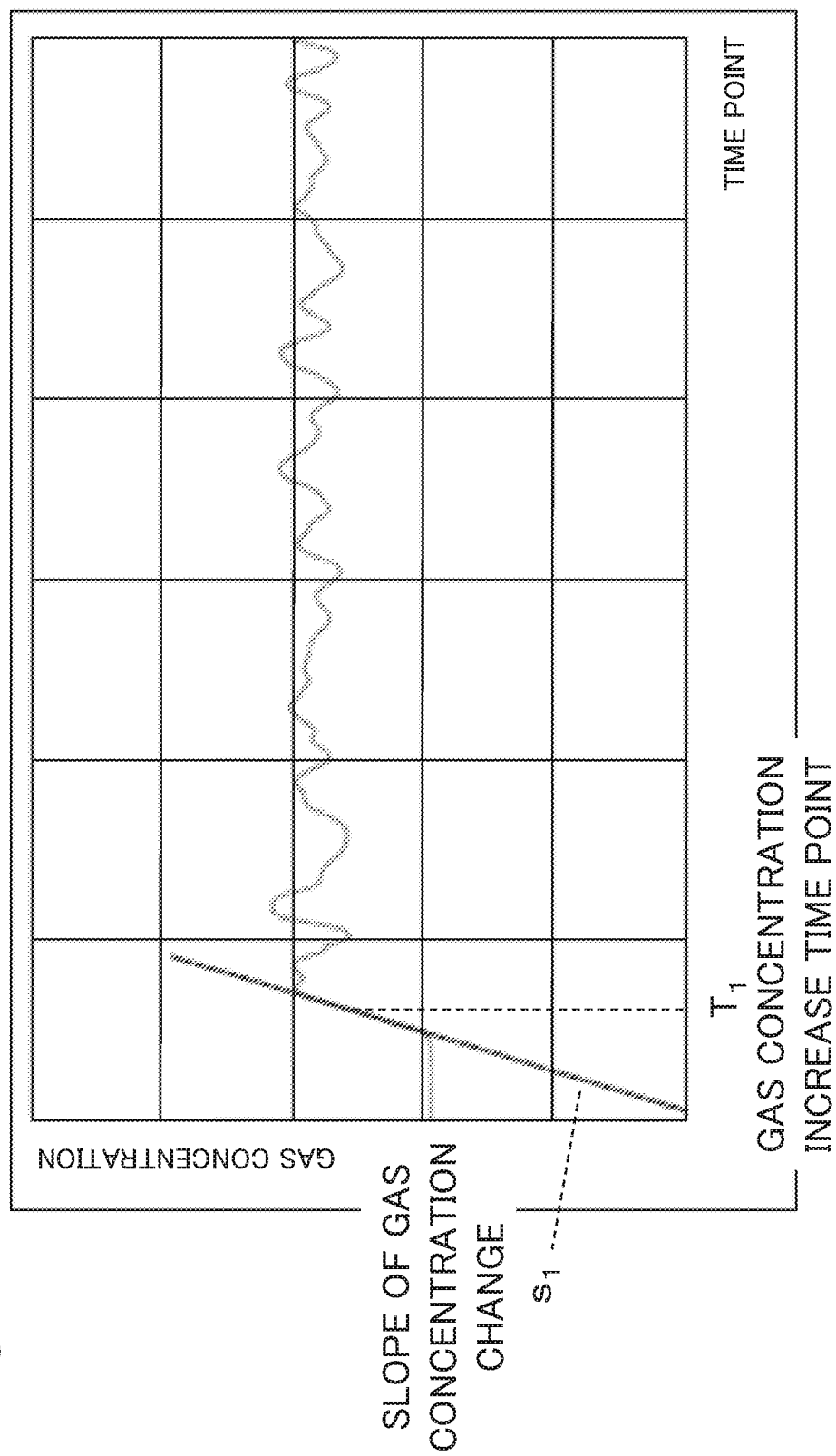
FIG. 4 is a diagram illustrating a temporal change in gas concentration measured by the gas sensor in FIG. 1.

FIG. 4 is a diagram illustrating a temporal change in gas concentration measured by the gas sensor 11a in FIG. 1. As illustrated in FIG. 4, after a fire occurs, a gas concentration sensed by the gas sensor 11a sharply increases, and then changes at an increased high level. The gas propagation speed calculation unit 12 senses, from the change in sensed gas concentration, as a gas concentration increase time point $T_1$, a center time point of a time zone in which due to a fire, a gas concentration sharply increases at $P_1$, for example. Similarly, the gas propagation speed calculation unit 12 senses, from the changes in gas concentration sensed by the gas sensors 11b and 11c, as gas concentration increase time points $T_2$ and $T_3$, center time points of time zones in which gas concentrations sharply increase at the arranged locations $P_2$ and $P_3$ due to the fire, and outputs the time points $T_2$ and $T_3$ to the fire information estimation unit 13.

From changes in gas concentration at the three locations sensed by the gas sensors 11a, 11b, and 11c, the gas propagation speed calculation unit 12 calculates slopes $s_1$, $s_2$, and $s_3$ of gas concentration changes when gas concentrations sharply change due to a fire. Based on the calculated slopes $s_1$, $s_2$, and $s_3$ of the gas concentration changes at the three locations, the gas propagation speed calculation unit 12 calculates gas propagation speeds $v_1$, $v_2$, and $v_3$ at the three locations.

Various methods of calculating a gas propagation speed from a temporal change in gas concentration can be considered, and for example, a conversion table indicating an association relation between a temporal change in gas concentration and a propagation speed of a gas may be preset in the gas propagation speed calculation unit 12, and by referring to the conversion table, gas propagation speeds $v_1$, $v_2$, and $v_3$ may be calculated from temporal changes in gas concentration. The conversion table indicating the association relation between a temporal change in gas concentration and a propagation speed of a gas may be prepared as follows, for example.

Figure 5:
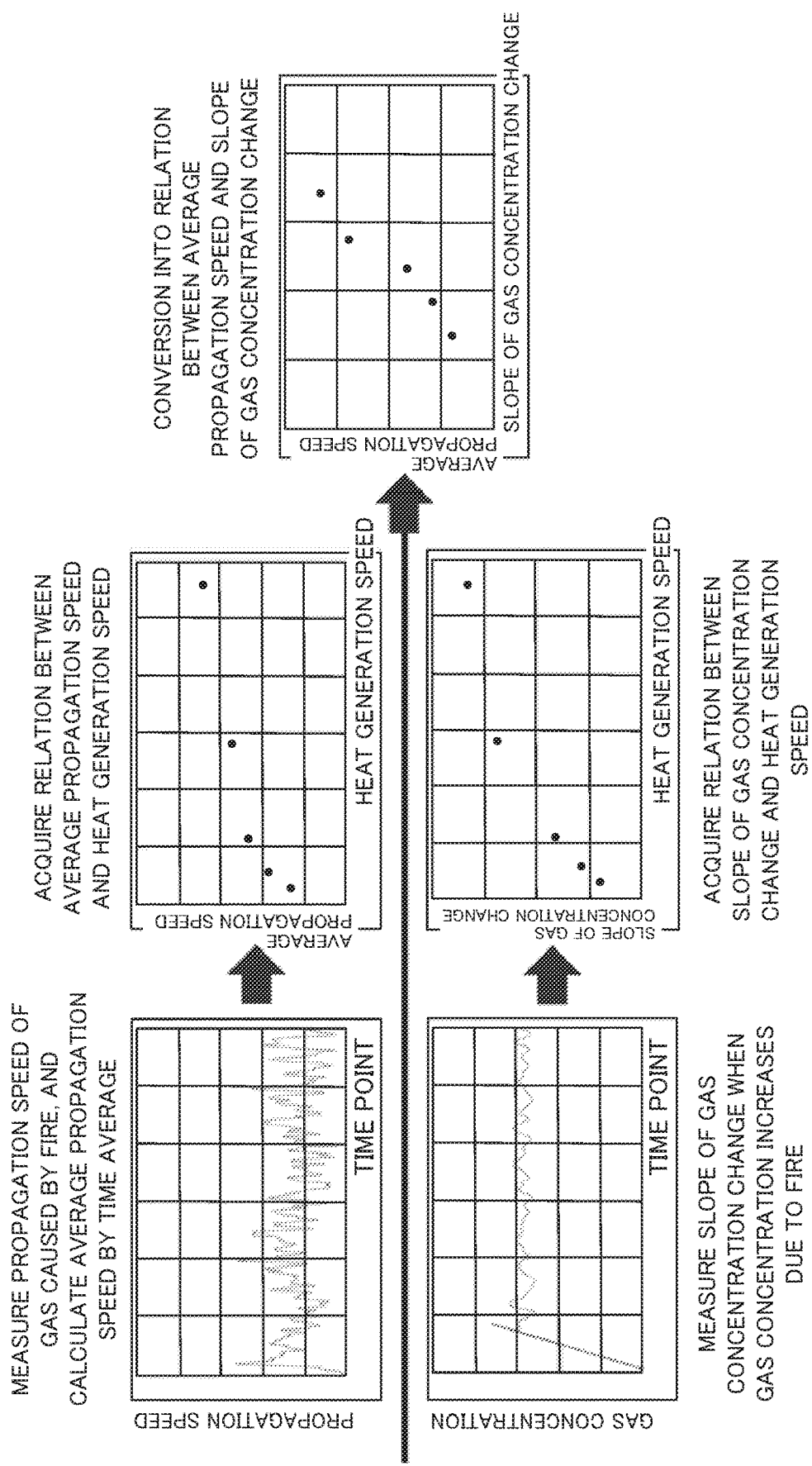
FIG. 5 is a diagram illustrating one example of a method of determining association between a temporal change in gas concentration and a gas propagation speed.

FIG. 5 is a diagram illustrating one example of a method of determining association between a temporal change in gas concentration and a gas propagation speed. A heat generation speed varies depending on an intensity of a fire and a component of a material burning at the time of the fire. A gas propagation speed at which a generated gas propagates and a slope of a gas concentration change when a gas concentration sharply increases vary depending on the heat generation speed. A heat generation speed is energy generated per unit time when a material burns. Accordingly, while changing an intensity of a fire and a component becoming fuel at the time of the fire, a heat generation speed, a gas propagation speed, and a gas concentration are measured, and a temporal change in gas propagation speed as in an upper left diagram in FIG. 5, and a temporal change in gas concentration as in an lower left diagram in FIG. 5 can be acquired. From the temporal change in gas propagation speed, an average gas propagation speed in each of the cases is determined. From the temporal change in gas concentration, a slope of a gas concentration change in each of the cases is determined. From the heat generation speed and the average gas propagation speed in each of the cases, a relation between a heat generation speed and an average gas propagation speed as in an upper center diagram in FIG. 5 is determined. From the heat generation speed and the slope of a gas concentration change in each of the cases, a relation between a heat generation speed and a slope of a gas concentration change as in a lower center diagram in FIG. 5 can be determined. A relation between an average gas propagation speed and a slope of a gas concentration change as in a right diagram in FIG. 5 can be determined.

When calculating gas propagation speeds $v_1$, $v_2$, and $v_3$ at the three locations $P_1$, $P_2$, and $P_3$ where the gas sensors 11a, 11b, and 11c are arranged, the gas propagation speed calculation unit 12 outputs these gas propagation speeds to the fire information estimation unit 13.

The fire information estimation unit 13 acquires, from the gas propagation speed calculation unit 12, gas concentration increase time points $T_1$, $T_2$, and $T_3$ at which gas concentrations sharply increase at the three locations $P_1$, $P_2$, and $P_3$ where the gas sensors 11a, 11b, and 11c are arranged, and gas propagation speeds $v_1$, $v_2$, and $v_3$ at the three locations $P_1$, $P_2$, and $P_3$.

The fire information estimation unit 13 estimates a position $P_0$ of a fire and an occurrence time point $T_0$ of the fire from the gas concentration increase time points $T_1$, $T_2$, and $T_3$ and the gas propagation speeds $v_1$, $v_2$, and $v_3$ at the three locations $P_1$, $P_2$, and $P_3$ where the gas sensors 11a, 11b, and 11c are arranged. Several methods of estimating the position $P_0$ of the fire and the occurrence time point $T_0$ of the fire can be considered.

For example, assuming that gas propagates from the position $P_0$ of the fire to the gas sensors 11a, 11b, and 11c at the calculated gas propagation speeds $v_1$, $v_2$, and $v_3$, simultaneous equations can be established as follows. For example, as illustrated in FIG. 3, assuming that the position $P_0$ of the fire is closer to the gas sensors 11a, 11b, and 11c in this order, a sharp increase in gas concentration occurs in this order, and distances from $P_0$ to $P_1$, $P_2$, and $P_3$ are set as $l_1$, $l_2$, and $l_3$, the following equations (1) and (2) are established.

$$T_2 - T_1 = \tag{1}$$
$$\frac{l_2}{v_2} - \frac{l_1}{v_1} = \frac{\sqrt{(x_2 - x_0)^2 + (y_2 - y_0)^2}}{v_2} - \frac{\sqrt{(x_1 - x_0)^2 + (y_1 - y_0)^2}}{v_1}$$

$$T_3 - T_1 = \tag{2}$$
$$\frac{l_3}{v_3} - \frac{l_1}{v_1} = \frac{\sqrt{(x_3 - x_0)^2 + (y_3 - y_0)^2}}{v_3} - \frac{\sqrt{(x_1 - x_0)^2 + (y_1 - y_0)^2}}{v_1}$$

Here, $x_0$, $x_1$, $x_2$, and $x_3$ are x coordinates of $P_0$, $P_1$, $P_2$, and $P_3$, and $y_0$, $y_1$, $y_2$, and $y_3$ are y coordinates of $P_0$, $P_1$, $P_2$, and $P_3$. The fire information estimation unit 13 substitutes, into these equations (1) and (2), the gas concentration increase time points $T_1$, $T_2$, and $T_3$ and the gas propagation speeds $v_1$, $v_2$, and $v_3$ at the three locations $P_1$, $P_2$, and $P_3$, solves the simultaneous equations, and can thereby estimate the position $P_0$ of the fire. There is a case where a plurality of coordinates $(x_0, y_0)$ are acquired as solutions of the simultaneous equations in the equations (1) and (2). In this case, the coordinate that is within a fire monitoring target area, for example, an area inside a tunnel in the case of a tunnel and that is closest to the gas sensor at which a sensed gas concentration is the highest can be estimated as the position $P_0$ of the fire.

Assuming that an occurrence time point of the fire is $T_0$, the following equation (3) is established.

$$T_0 = T_1 - \frac{l_1}{v_1} = T_1 - \frac{\sqrt{(x_1 - x_0)^2 + (y_1 - y_0)^2}}{v_1} \tag{3}$$

The fire information estimation unit 13 substitutes, into this equation (3), the position coordinate of $P_1$ at which the gas sensor 11a is arranged, the gas concentration increase time point $T_1$ and the gas propagation speed $v_1$ at $P_1$, and the estimated position coordinate of the position $P_0$ of the fire, and can thereby estimate the fire occurrence time point $T_0$.

Alternatively, the fire occurrence time point $T_0$ can be estimated by substituting, into the equation (3), the position coordinate of $P_2$, and the gas concentration increase time point $T_2$ and the gas propagation speed $v_2$ at $P_2$ instead of the position coordinate of $P_1$, the gas concentration increase time point $T_1$, and the gas propagation speed $v_1$. Alternatively, the fire occurrence time point $T_0$ can be estimated by substituting, into the equation (3), the position coordinate, the gas concentration increase time point, and the gas propagation speed of $P_3$ instead of the position coordinate of $P_1$, the gas concentration increase time point $T_1$, and the gas propagation speed $v_1$. Alternatively, the fire occurrence time point $T_0$ can be estimated by calculating an average value of a plurality of values of $T_0$ calculated by these methods. A method of calculating a position of a fire and an occurrence time point of the fire is not limited to these.

Figure 9:
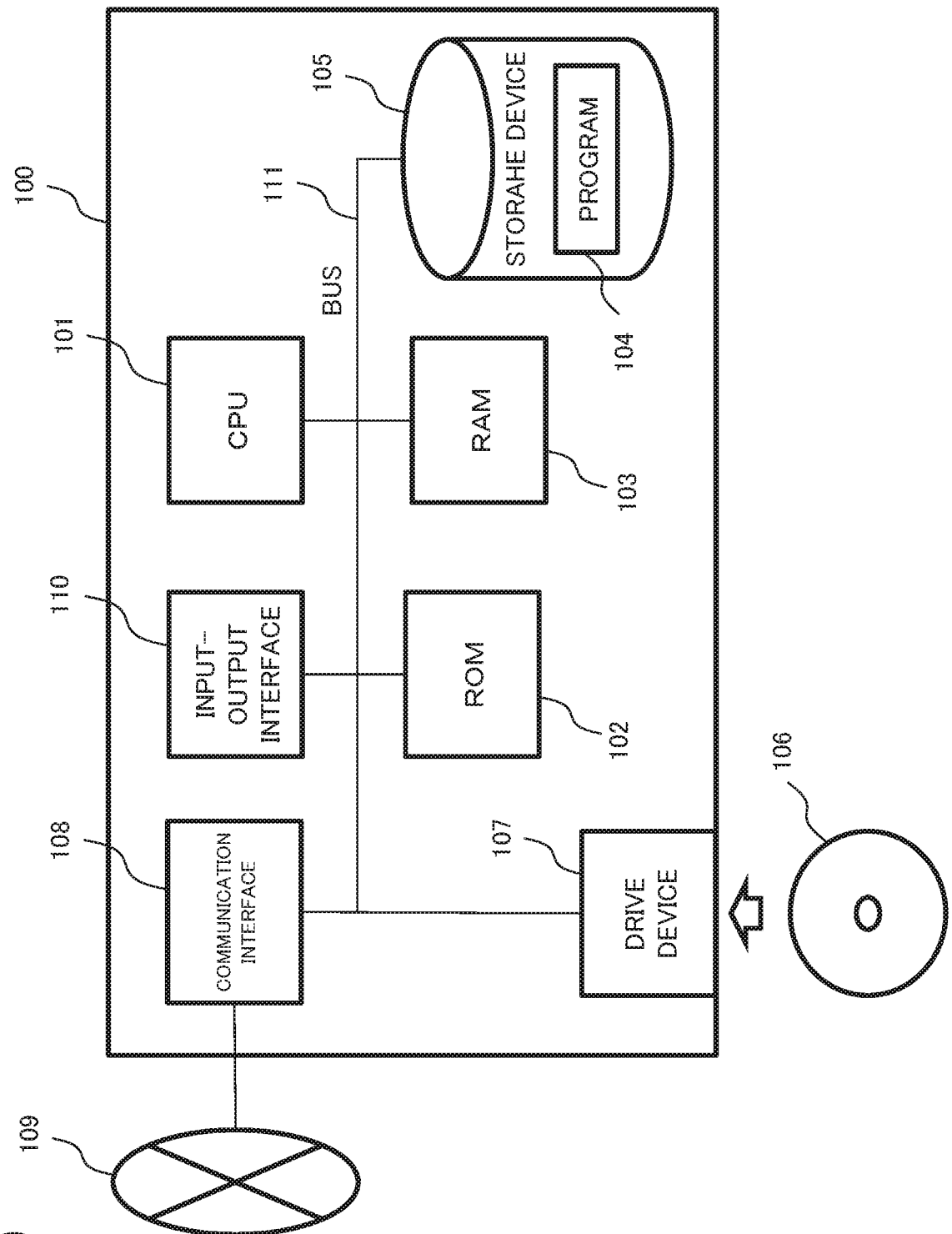
FIG. 9 is a block diagram illustrating a configuration of a computer that implements a function of each unit in each example embodiment.

Each constituent element of the fire sensing system according to the first example embodiment and each of the below-described example embodiments indicates a block of a function unit. A part or all of each constituent element of the fire sensing system according to the present example embodiment may be implemented by any combination of a computer 100 as illustrated in FIG. 9 and a program, for example. The computer 100 includes the following configuration as one example.

Central processing unit (CPU) 101
Read only memory (ROM) 102
Random access memory (RAM) 103
Program 104 loaded in RAM 103
Storage device 105 storing program 104
Drive device 107 performing writing to and reading from storage medium 106
Communication interface 108 connecting to communication network 109
Input-output interface 110 inputting and outputting data
Bus 111 connecting constituent elements The function of each constituent element of the fire sensing system according to the present example embodiment is implemented by the CPU 101 acquiring and executing the program 104 that implements the function. The program 104 that implements the function of each constituent element of each device is stored in advance in the storage device 105, the ROM 102, or the RAM 103, for example, and is read by the CPU 101, depending on necessity.

The program 104 may be supplied to the CPU 101 via the communication network 109, or the program 104 may be stored in advance in the recording medium 106, and the drive device 107 may read out the program and supply the program to the CPU 101.

As a method of implementing the function of each constituent element of the fire sensing system, there are various modification examples. For example, the function of each constituent element of the fire sensing system may be implemented by any combination of a computer and a program that are individual for each constituent element. Alternatively, the functions of a plurality of constituent elements included in each device may be implemented by any combination of one computer and a program.

A part or the entirety of each constituent element of the fire sensing system may be implemented by another general-purpose or dedicated circuitry, a processor, or the like, or a combination thereof. These may be configured by a single chip, or may be configured by a plurality of chips connected to each other via a bus. Alternatively, a part or the entirety of each constituent element of each device may be implemented by a combination of the above-described circuitry or the like and a program.

When a part or the entirety of each constituent element of the fire sensing system is implemented by a plurality of computers, pieces of circuitry, or the like, a plurality of computers, pieces of circuitry, or the like may be arranged in a concentrated manner, or may be arranged in a distributed manner. For example, computers, pieces of circuitry, or the like may be implemented as a form of being connected to each other via a communication network.

Figure 6:
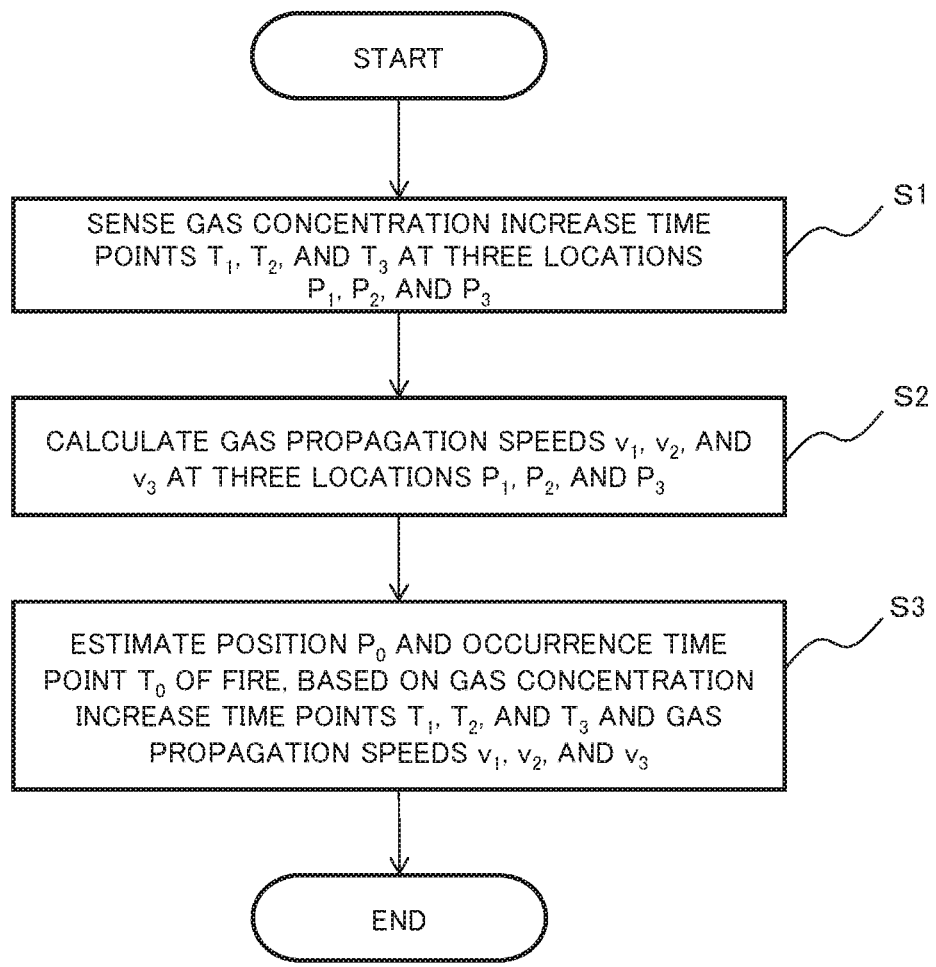
FIG. 6 is a flowchart illustrating operation of estimating a fire position in FIG. 1 and an occurrence time point.

Next, operation of the present example embodiment is described. FIG. 6 is a flowchart illustrating the operation of estimating a fire position in FIG. 1 and an occurrence time point. First, as described above, the gas sensors 11a, 11b, and 11c sense gas concentrations at three locations $P_1$, $P_2$, and $P_3$ in a tunnel, and from changes in gas concentration, gas concentration increase time points $T_1$, $T_2$, and $T_3$ at which gas concentrations sharply increase due to a fire are sensed (step S1).

Next, from changes in gas concentration at the three locations sensed by the gas sensors 11a, 11b, and 11c, the gas propagation speed calculation unit 12 calculates slopes $s_1$, $s_2$, and $s_3$ of gas concentration changes when gas concentrations sharply increase due to the fire. From the calculated slopes $s_1$, $s_2$, and $s_3$ of gas concentration changes, the gas propagation speed calculation unit 12 calculates gas propagation speeds $v_1$, $v_2$, and $v_3$ at the three locations $P_1$, $P_2$, and $P_3$ (step S2).

Based on the gas concentration increase time points $T_1$, $T_2$, and $T_3$ and the gas propagation speeds $v_1$, $v_2$, and $v_3$ at the three locations $P_1$, $P_2$, and $P_3$, the fire information estimation unit 13 estimates a position $P_0$ and an occurrence time point $T_0$ of the fire (step S3).

As described above, according to the present example embodiment, the gas propagation speed calculation unit 12 senses gas concentration increase time points TK $T_2$, and $T_3$ at which gas concentrations sharply increase at three locations $P_1$, $P_2$, and $P_3$ in a tunnel due to a fire, and calculates gas propagation speeds $v_1$, $v_2$, and $v_3$ at the three locations from slopes $s_1$, $s_2$, and $s_3$ of gas concentration changes at the three locations $P_1$, $P_2$, and $P_3$. Based on the gas concentration increase time points TK $T_2$, and $T_3$ and the gas propagation speeds $v_1$, $v_2$, and $v_3$ at the three locations, the fire information estimation unit 13 estimates a position $P_0$ and an occurrence time point $T_0$ of the fire. With this configuration, a position and an occurrence time point of a fire in a tunnel can be estimated without installing a large number of gas sensors.

Figure 7:
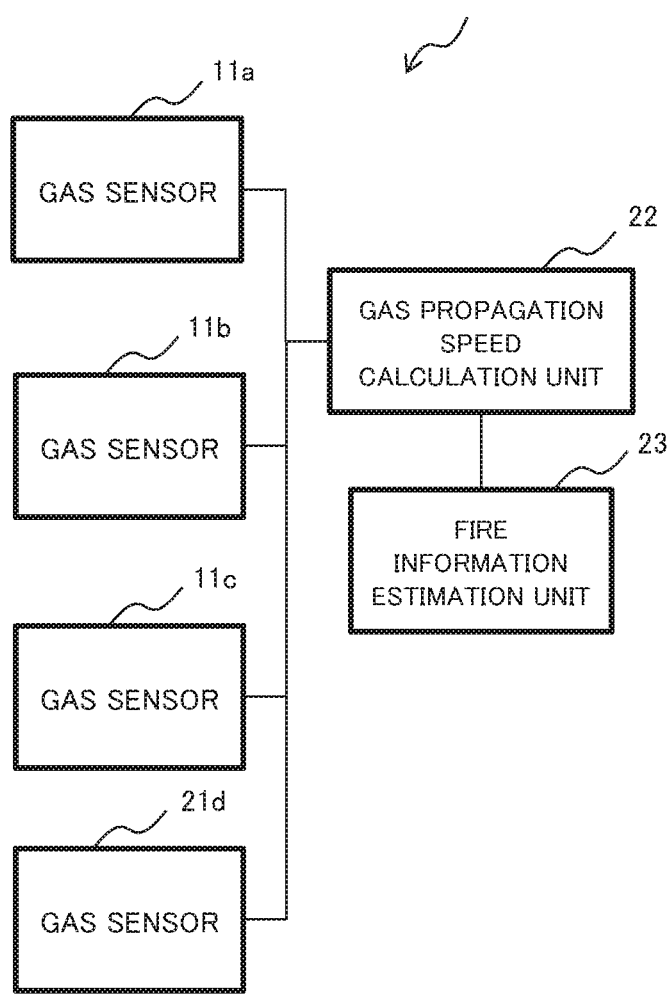
FIG. 7 is a block diagram illustrating a configuration of a second example embodiment.

A configuration in which a fourth sensor differing in a height-direction position is provided may be made in such a way as to enable implementation of sensing of a fire position even when a fire does not occur on the ground. FIG. 7 is a block diagram illustrating a configuration of a second example embodiment. In a fire sensing system 2 according to the present example embodiment, gas sensors 11a, 11b, and 11c arranged at three locations $P_1$, $P_2$, and $P_3$ and a gas sensor 21d arranged at another location $P_4$ sense changes in gas concentration at the four locations. From the changes in gas concentration at the four locations, the gas propagation speed calculation unit 22 calculates gas concentration increase time points TK $T_2$, $T_3$, and $T_4$ at which gas concentrations sharply increase, and slopes of $s_1$, $s_2$, $s_3$, and $s_4$ of gas concentration changes when gas concentrations sharply increase due to a fire. From the calculated slopes $s_1$, $s_2$, $s_3$, and $s_4$ of gas concentration changes, the gas propagation speed calculation unit 22 calculates gas propagation speeds $v_1$, $v_2$, $v_3$, and $v_4$ at the four locations $P_1$, $P_2$, $P_3$, and $P_4$.

The fire information estimation unit 23 acquires the gas concentration increase time points $T_1$, $T_2$, $T_3$, and $T_4$ at which gas concentrations sharply increase at the four locations $P_1$, $P_2$, $P_3$, and $P_4$, and the gas propagation speeds $v_1$, $v_2$, $v_3$, and $v_4$ at the four locations $P_1$, $P_2$, $P_3$, and $P_4$. From the gas concentration increase time points $T_1$, $T_2$, $T_3$, and $T_4$ and the gas propagation speeds $v_1$, $v_2$, $v_3$, and $v_4$ at the four locations $P_1$, $P_2$, $P_3$, and $P_4$ where the gas sensors 11a, 11b, 11c, and 21d are arranged, the fire information estimation unit 23 estimates a position $P_0$ of a fire and an occurrence time point $T_0$ of the fire. Several methods of estimating a position $P_0$ of a fire and an occurrence time point $T_0$ of the fire can be considered.

For example, assuming that gas propagates from the position $P_0$ of the fire to the gas sensors 11a, 11b, 11c, and 21d at the calculated gas propagation speeds $v_1$, $v_2$, $v_3$, and $v_4$, simultaneous equations can be set as follows. For example, assuming that the position $P_0$ of the fire is closer to the gas sensors 11a, 11b, 11c, and 21d in this order as illustrated in FIG. 3, a sharp increase in gas concentration occurs in this order, and distances from $P_0$ to $P_1$, $P_2$, $P_3$, and $P_4$ are set as $l_1$, $l_2$, $l_3$, and $l_4$, the following equations (4), (5), and (6) are established.

$$T_2 - T_1 = \frac{l_2}{v_2} - \frac{l_1}{v_1} = \frac{\sqrt{(x_2-x_0)^2 + (y_2-y_0)^2 + (z_2-z_0)^2}}{v_2} - \frac{\sqrt{(x_1-x_0)^2 + (y_1-y_0)^2 + (z_1-z_0)^2}}{v_1} \quad (4)$$

$$T_3 - T_1 = \frac{l_3}{v_3} - \frac{l_1}{v_1} = \frac{\sqrt{(x_3-x_0)^2 + (y_3-y_0)^2 + (z_3-z_0)^2}}{v_3} - \frac{\sqrt{(x_1-x_0)^2 + (y_1-y_0)^2 + (z_1-z_0)^2}}{v_1} \quad (5)$$

$$T_4 - T_1 = \frac{l_4}{v_4} - \frac{l_1}{v_1} = \frac{\sqrt{(x_4-x_0)^2 + (y_4-y_0)^2 + (z_4-z_0)^2}}{v_4} - \frac{\sqrt{(x_1-x_0)^2 + (y_1-y_0)^2 + (z_1-z_0)^2}}{v_1} \quad (6)$$

Here, $x_0$, $x_1$, $x_2$, $x_3$, and $x_4$ are x coordinates of $P_0$, $P_1$, $P_2$, $P_3$, and $P_4$, $y_0$, $y_1$, $y_2$, $y_3$, and $y_4$ are y coordinates of $P_0$, $P_1$, $P_2$, $P_3$, and $P_4$, and $z_0$, $z_1$, $z_2$, $z_3$, and $z_4$ are z coordinates of $P_0$, $P_1$, $P_2$, $P_3$, and $P_4$.

The fire information estimation unit 23 substitutes, into these equations (4), (5), and (6), the gas concentration increase time points $T_1$, $T_2$, $T_3$, and $T_4$ and the gas propagation speeds $v_1$, $v_2$, $v_3$, and $v_4$ at the four locations $P_1$, $P_2$, $P_3$, and $P_4$, solves the simultaneous equations, and can thereby estimate the position $P_0(x_0, y_0, z_0)$ of the fire. There is a case where a plurality of coordinates $(x_0, y_0, z_0)$ are acquired as solutions of the simultaneous equations in the equations (4), (5), and (6). In this case, the coordinate that is within a fire monitoring target area, for example, an area inside a tunnel in the case of a tunnel and that is closest to the gas sensor at which a sensed gas concentration is the highest can be estimated as a position $P_0$ of a fire.

Assuming that an occurrence time point of the fire is $T_0$, the following equation (7) is established.

$$T_0 = T_1 - \frac{l_1}{v_1} = T_1 - \frac{\sqrt{(x_1 - x_0)^2 + (y_1 - y_0)^2 + (z_1 - z_0)^2}}{v_1} \quad (7)$$

The fire information estimation unit 23 substitutes, into this equation (7), the position coordinates $x_1$, $y_1$, and $z_1$ of $P_1$ where the gas sensor 11a is arranged, the gas concentration increase time point $T_1$ and the gas propagation speed $v_1$ at $P_1$, and the estimated position $P_0$ of the fire, and can thereby estimate the occurrence time point $T_0$ of the fire.

Alternatively, the occurrence time point $T_0$ of the fire can be estimated by substituting, into the equation (7), the position coordinate, and the gas concentration increase time point, and the gas propagation speed of $P_2$, $P_3$, or $P_4$ instead of the position coordinate, the gas concentration increase time point, and the gas propagation speed of P1. Alternatively, the fire occurrence time point $T_0$ can be estimated by calculating a plurality of values of $T_0$ by these methods, and calculating average values of these x coordinates, y coordinates, and z coordinates. A method of calculating a position of a fire and an occurrence time point of the fire is not limited to these.

Operation of the present example embodiment is similar to the operation of the first example embodiment illustrated in FIG. 6. As illustrated in FIG. 6, first, the gas sensors 11a, 11b, 11c, and 21d sense gas concentrations at four locations $P_1$, $P_2$, $P_3$, and $P_4$ in a tunnel, and from changes in the gas concentrations, the gas propagation speed calculation unit 22 senses gas concentration increase time points $T_1$, $T_2$, $T_3$, and $T_4$ at which gas concentrations sharply increase due to a fire.

Next, from changes in gas concentration at the four locations $P_1$, $P_2$, $P_3$, and $P_4$ sensed by the gas sensors 11a, 11b, 11c, and 21d, the gas propagation speed calculation unit 22 calculates slopes $s_1$, $s_2$, $s_3$, and $s_4$ of gas concentration changes when gas concentrations sharply increase due to the fire. From the calculated slopes $s_1$, $s_2$, $s_3$, and $s_4$ of gas concentrations, the gas propagation speed calculation unit 22 calculates gas propagation speeds vu $v_2$, $v_3$, and $v_4$ at the four locations $P_1$, $P_2$, $P_3$, and $P_4$.

Based on the gas concentration increase time points $T_1$, $T_2$, $T_3$, and $T_4$ and the gas propagation speeds $v_1$, $v_2$, $v_3$, and $v_4$ of the four locations $P_1$, $P_2$, $P_3$, and $P_4$, the fire information estimation unit 13 estimates a position $P_0$ and an occurrence time point $T_0$ of the fire.

The configuration of the present example embodiment also enables estimation of a position and an occurrence time point of a fire in a tunnel without installing a large number of gas sensors. By estimating a fire position by using changes in gas concentration of the gas sensors at four locations, a position of a fire can be sensed even when the fire does not occur on the ground.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Figure 8:
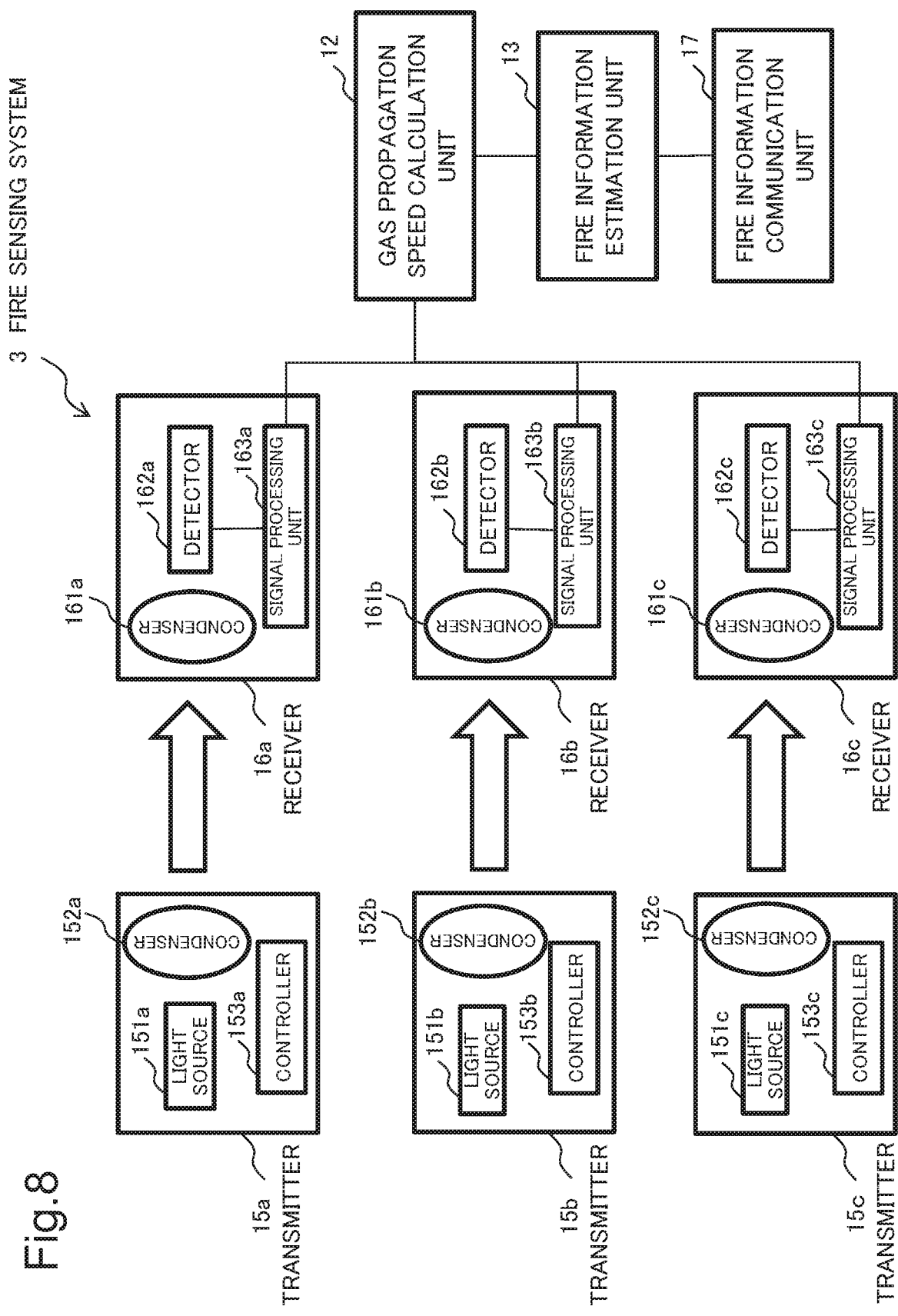
FIG. 8 is a block diagram illustrating a configuration of a modification example of gas sensors.

For example, the gas sensor may be a gas sensor using an optical gas sensing technique. FIG. 8 is a block diagram illustrating a configuration of the present modification example. As illustrated in FIG. 8, a fire sensing system 3 according to the present modification example includes transmitters 15a, 15b, and 15c that send light of a wavelength absorbed by gas generated by a fire, and receivers 16a, 16b, and 16c that receive the light sent from the transmitters 15a, 15b, and 15c and sense gas concentrations, instead of the gas sensors 11a, 11b, and 11c in FIG. 1. The transmitters 15a, 15b, and 15c include light sources 151a, 151b, and 151c, condensers 152a, 152b, and 152c that condense light from the light sources 151a, 151b, and 151c, and controllers 153a, 153b, and 153c that control optical axes of the light to be sent. The receivers 16a, 16b, and 16c include condensers 161a, 161b, and 161c that condense light from the transmitters 15a, 15b, and 15c, detectors 162a, 162b, and 162c that detect intensities of the light, and signal processing units 163a, 163b, and 163c that calculate gas concentrations from output signals of the detectors and output the gas concentrations.

Similarly, the second example embodiment may be also configured in such a way as to include, instead of the gas sensor, a transmitter sending light of a wavelength absorbed by gas generated by a fire and a receiver receiving light sent from the transmitter and sensing a gas concentration.

According to such a configuration, an advantageous effect similar to that of the first and second example embodiments can be achieved, and each sensor including the transmitter and the optical receiver can sense gas in a wide area.

REFERENCE SIGNS LIST 1, 2, 3 Fire sensing system
11a, 11b, 11c, 21d Gas sensor
12, 22 Gas propagation speed calculation unit
13, 23 Fire information estimation unit
15a, 15b, 15c Transmitter
151a, 151b, 151c Light source
152a, 152b, 152c Condenser
16a, 16b, 16c Receiver
161a, 161b, 161c Condenser
162a, 162b, 162c Detector
163a, 163b, 163c Signal processing unit
20 Tunnel
21 Ceiling
100 Computer
101 CPU
102 ROM
103 RAM
104 Program
105 Storage device
106 Recording medium
107 Drive device
108 Communication interface
109 Communication network
110 Input-output interface
111 Bus

The invention claimed is:

1. A fire sensing system comprising:
   a gas sensor sensing changes in gas concentration at three locations;
   a gas propagation speed calculation unit sensing gas concentration increase time points at the three locations, and calculating gas propagation speeds at the three locations; and
   a fire information estimation unit estimating a position of a fire, based on the gas concentration increase time points and the gas propagation speeds.

2. The fire sensing system according to claim 1, wherein the gas sensor are arranged in such a way as not to be aligned on a straight line in a plane parallel to ground.

3. The fire sensing system according to claim 1, wherein
   the gas sensor senses a change in gas concentration at another location,
   the gas propagation speed calculation unit senses a gas concentration increase time point at the another location, based on a change in gas concentration at the another location, and calculates a gas propagation speed at the another location, and
   the fire information estimation unit estimates a position of the fire, based on the gas concentration increase time points and the gas propagation speeds at the three locations and the gas concentration increase time point and the gas propagation speed at the another location.

4. The fire sensing system according to claim 1, wherein the fire information estimation unit estimates an occurrence time point of the fire, based on the gas concentration increase time point and the gas propagation speed.

5. The fire sensing system according to claim 1, wherein the gas sensor includes:
   a transmitter including a light source that sends an optical signal, and a condenser; and
   a reception unit including a condenser that condenses an optical signal from the transmitter, a detection unit receiving the optical signal, and a signal processing unit calculating a gas concentration from an optical signal received by the detection unit.

6. The fire sensing system according to claim 1, further comprising a fire information communication unit communicating information of a position of the fire.

7. The fire sensing system according to claim 2, wherein
   the gas sensor senses a change in gas concentration at another location,
   the gas propagation speed calculation unit senses a gas concentration increase time point at the another location, based on a change in gas concentration at the another location, and calculates a gas propagation speed at the another location, and
   the fire information estimation unit estimates a position of the fire, based on the gas concentration increase time points and the gas propagation speeds at the three locations and the gas concentration increase time point and the gas propagation speed at the another location.

8. The fire sensing system according to claim 2, wherein the fire information estimation unit estimates an occurrence time point of the fire, based on the gas concentration increase time point and the gas propagation speed.

9. The fire sensing system according to claim 3, wherein the fire information estimation unit estimates an occurrence time point of the fire, based on the gas concentration increase time point and the gas propagation speed.

10. The fire sensing system according to claim 2, wherein the gas sensor includes:
    a transmitter including a light source that sends an optical signal, and a condenser; and
    a reception unit including a condenser that condenses an optical signal from the transmitter, a detection unit receiving the optical signal, and a signal processing unit calculating a gas concentration from an optical signal received by the detection unit.

11. The fire sensing system according to claim 3, wherein the gas sensor includes:
    a transmitter including a light source that sends an optical signal, and a condenser; and
    a reception unit including a condenser that condenses an optical signal from the transmitter, a detection unit receiving the optical signal, and a signal processing unit calculating a gas concentration from an optical signal received by the detection unit.

12. The fire sensing system according to claim 4, wherein the gas sensor includes:
    a transmitter including a light source that sends an optical signal, and a condenser; and
    a reception unit including a condenser that condenses an optical signal from the transmitter, a detection unit receiving the optical signal, and a signal processing unit calculating a gas concentration from an optical signal received by the detection unit.

13. The fire sensing system according to claim 2, further comprising a fire information communication unit communicating information of a position of the fire.

14. The fire sensing system according to claim 3, further comprising a fire information communication unit communicating information of a position of the fire.

15. The fire sensing system according to claim 4, further comprising a fire information communication unit communicating information of a position of the fire.

16. The fire sensing system according to claim 5, further comprising a fire information communication unit communicating information of a position of the fire.

17. A fire sensing method comprising:
    sensing gas concentration increase time points at three locations;
    calculating gas propagation speeds at the three locations; and
    estimating a position of the fire, based on the gas concentration increase time points and the gas propagation speeds.

18. A non-transitory computer readable medium having a fire sensing program stored thereon, the fire sensing program causing a computer to execute:
    processing of sensing gas concentration increase time points at three locations;
    processing of calculating gas propagation speeds at the three locations; and
    processing of estimating a position of the fire, based on the gas concentration increase time points and the gas propagation speeds.

* * * * *